G. B. CUBBERLEY.
DRILL-CHUCK.
No. 180,117.
Patented July 25, 1876.
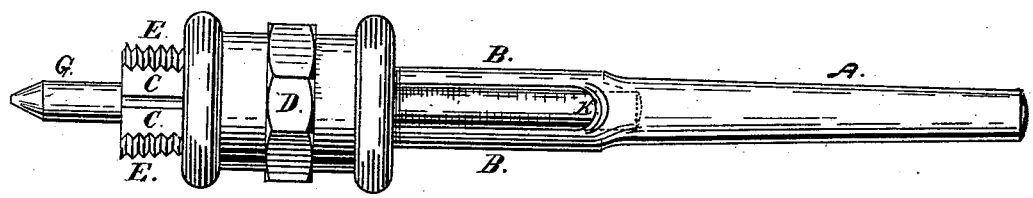

UNITED STATES PATENT OFFICE.

GARRETT B. CUBBERLEY, OF MILWAUKEE, WISCONSIN, ASSIGNOR TO JAMES P. THOMPSON, OF SAME PLACE.

IMPROVEMENT IN DRILL-CHUCKS.

Specification forming part of Letters Patent No. 180,117, dated July 25, 1876; application filed April 20, 1876.

*To all whom it may concern:*

Be it known that I, GARRETT B. CUBBERLEY, of the city of Milwaukee, in the county of Milwaukee, and State of Wisconsin, have invented certain new and useful Improvements in Drill-Chucks; and I do hereby declare that the following is a full, clear, and exact description thereof, which will enable others skilled in the art to which it appertains to make and use the same, reference being had to the accompanying drawings, and to the letters of reference marked thereon, which form a part of this specification.

This invention consists in certain improvements in drill-chucks, by which the drill or tool is grasped and held between spring-jaws adapted to move to and from a common center. The spring-jaws are opened and closed by turning a burr, which surrounds them, backward or forward—turning the screw forward, causing the jaws to close. A reverse movement allows them to open.

The accompanying drawing represents a side view of my invention.

A in the accompanying drawing is the shank or spindle of the drill-chuck, by which it may be attached to the mandrel of a lathe. B B are spring-jaws. C C is the chuck-head. D is a burr. E is a thread upon the edge of the chuck-head C, upon which the burr turns. The diameter of the chuck-head C C is largest at its front end, and as the burr D is turned forward upon the largest diameter of the chuck-head C C, the spring-jaws B B are forced together. G is the drill or other tool, but loosely resting in the drill-chuck, and is made fast by turning the burr or screw D forward by hand or wrench. By a reverse movement of the burr or screw D the jaws B B are allowed to spring apart, and the drill is thereby loosened. K is a centering recess or hole in the spindle A for receiving the inner end of the drill, and so that it may be moved longitudinally therein, and always be truly centered, by which arrangement the drill G may be adjusted in the chuck-head near its cutting-point, thereby securing a steady movement to the drill, and whereby a heavier chip may be cut with the same sized drill than can be with the ordinary chuck.

I claim as my invention—

The spindle A, having the centering recess or hole K, in combination with the spring-jaws B B, having threaded chuck-heads C C, and with the burr D, substantially as and for the purpose specified.

In testimony that I claim the foregoing as my own I affix my signature in presence of two witnesses.

GARRETT B. CUBBERLEY.

Witnesses:
K. SHAWVAN,
M. H. RIDDELL.